United States Patent [19]

Hayashi et al.

[11] 3,770,224
[45] Nov. 6, 1973

[54] AUTOMATIC LOCK-UP DEVICE FOR SAFETY BELT

[75] Inventors: Yoshihiro Hayashi, Toyota; Masahiro Iwatsuki, Anjo, both of Japan

[73] Assignee: Kabushiki Kaisha Tokai Rika Denki Seisakusho, Aichi-ken, Japan

[22] Filed: Sept. 28, 1971

[21] Appl. No.: 184,362

[30] Foreign Application Priority Data

Oct. 7, 1970 Japan.............................. 45/99739

[52] U.S. Cl. ........................ 242/107.4, 242/107.4
[51] Int. Cl. ...................... A62b 35/02, B65h 63/04
[58] Field of Search .................. 242/107.4, 107.5 B; 297/386, 387, 388; 280/150 SB

[56] References Cited
UNITED STATES PATENTS

| | | |
|---|---|---|
| 3,343,765 | 9/1967 | Baker.............................. 242/107.4 |
| 3,343,763 | 9/1967 | Spouge............................ 242/107.4 |
| 3,430,891 | 3/1969 | Burleigh........................... 242/107.4 |
| 3,578,260 | 5/1971 | Kell................................ 242/107.4 |

Primary Examiner—Stanley N. Gilreath
Assistant Examiner—Jon W. Henry
Attorney—B. Edward Shlesinger et al.

[57] ABSTRACT

An automatic lock-up device for a safety belt which comprises a lock-up gear secured to a belt wind-up or rewind sleeve, a lock-up lever pivotally mounted to a belt housing so as to be oscillable into engagement with said lock-up gear for restraining rotation of the safety belt in the pay-out direction, a lock-up control plate movable in a horizontal plane and comprising an annular section at one side and a conical section at the other side, a spherical body encircled by said annular section and movable on a saucer-like housing upon sensing vehicle acceleration or deceleration, and an axially movable motion-transmitting pin normally resting at its lower part on the central part of said conical section of said control plate and abutting at its upper end with said lock-up lever.

4 Claims, 5 Drawing Figures

AUTOMATIC LOCK-UP DEVICE FOR SAFETY BELT

BACKGROUND OF THE INVENTION

This invention relates to an improvement in an automatic lock-up device for a safety belt associated with a passenger seat of a vehicle and the like, and more particularly to such device whereby the safety belt drum is automatically locked against rotation in the pay-out direction when a sudden brake or collision or such other incident that may cause sudden vehicle deceleration takes place and thus the safety belt will always operate normally without any serious danger to the vehicle passenger.

The present automatic device for a safety belt comprises a lock-up gear secured to a belt wind-up or rewind sleeve, a lock-up lever pivotally mounted to a belt housing so as to be oscillable into engagement with said lock-up gear for restraining rotation of the safety belt in the pay-out direction, a lock-up control plate movable in a horizontal plane and comprising an annular section at one side and a conical section at the other side, a spherical body encircled by said annular section and movable on a saucer like housing upon sensing vehicle acceleration or deceleration, and an axially movable motion-transmitting pin normally resting at its lower part on the central part of said conical section of said control plate and abutting at its upper end with said lock-up lever.

It is known to use an automatic lock-up mechanism for a safety belt having an operating member directly contacting a spherical body resting normally on the central part of a support saucer and movable on said saucer upon sensing vehicle acceleration or deceleration, the movement of said operating member caused by said spherical body acting urgently in an emergency for restraining the rotation of a gear secured to a belt wind-up sleeve in its pay-out direction. This known device has a serious drawback in that the weight or working resistance of the operating body will act on the spherical body directly, thus rendering the sensing of the vehicle acceleration and deceleration ineffective. The present invention proposes an improvement over this known mechanism.

BRIEF DESCRIPTION OF DRAWINGS

In the drawings illustrative of an embodiment of the present invention.

DESCRIPTION OF AN EMBODIMENT

In the following, an embodiment of the invention will be explained in detail by referring to the accompanying drawings.

Figure 1:
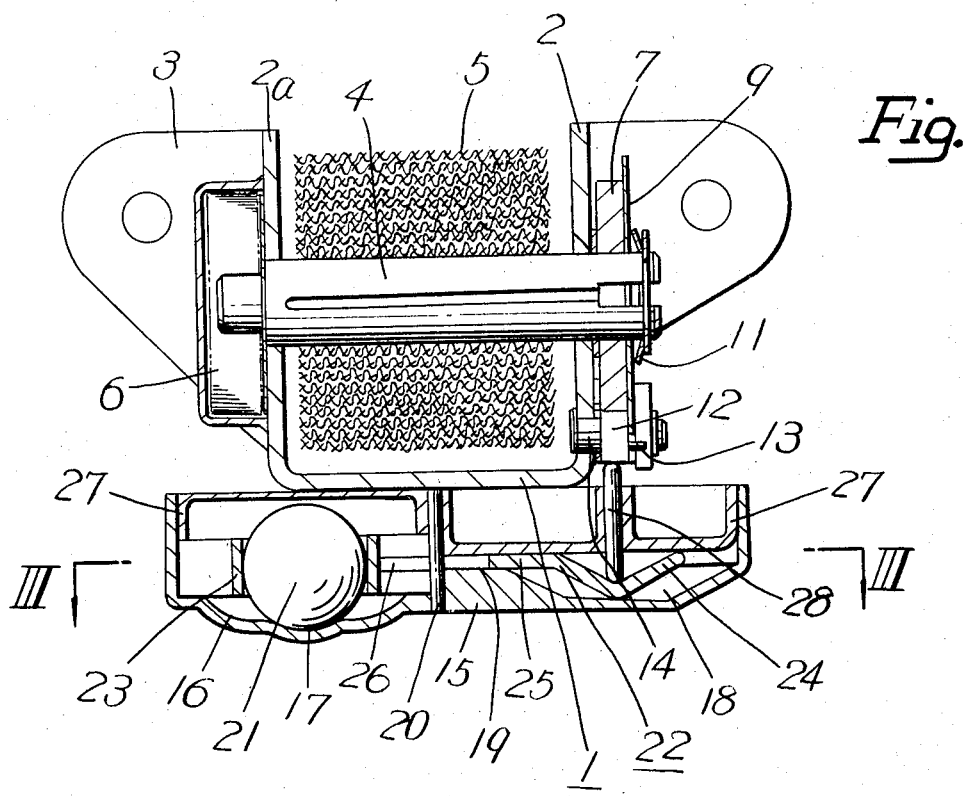
FIG. 1 is a front sectional view taken on the line I—I of FIG. 2.
Figure 2:
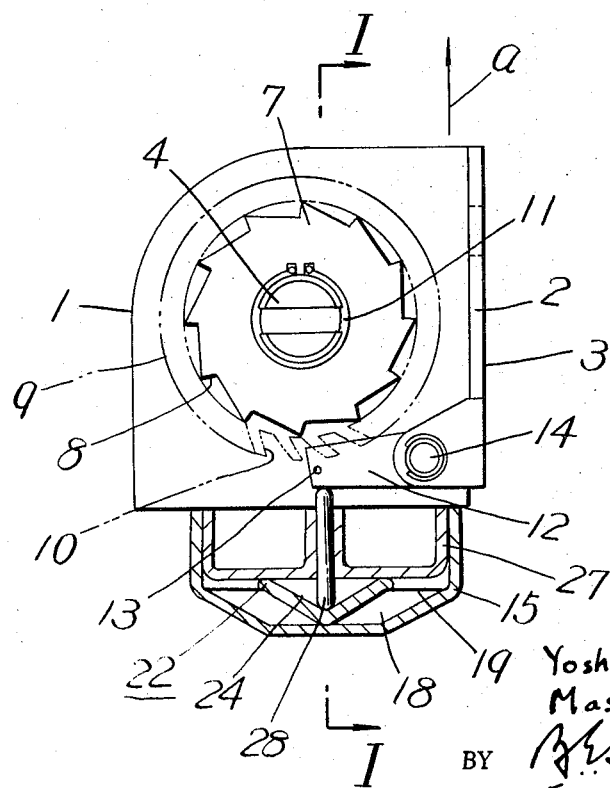
FIG. 2 is a partly cut side elevational view of the present device.

The numeral 1 in the drawing denotes a belt housing passed through by a wind-up sleeve 4 and equipped with a mounting bracket 3. The numeral 5 indicates a safety belt that is secured at one end to said sleeve 4 and can be payed out in a direction shown by the arrow *a* in FIG. 5. The numeral 6 indicates a wind-up spring annexed to said sleeve 4 on one side wall 2*a* of the belt housing 1. The numeral 7 indicates a lock-up gear comprising a sprocket wheel secured to said sleeve 4 on the external part of the other side wall 2 of the belt housing 1 and having its tooth flanks directed in the belt pay-out direction as shown in FIG. 2. The numeral 9 denotes an auxiliary lock-up gear loosely mounted on said sleeve 4 on the outside of the lock-up gear 7, as shown in FIG. 1. Said gear 9 has a number of teeth 10 inclined at a certain angle relative to the belt pay-out direction. The numeral 11 denotes a spring secured to the end part of the sleeve 4 and acting on the gear 9 so as to urge it resiliently against the side face of the lock-up gear 7 into frictional engagement therewith. The numeral 12 indicates a lock-up lever slidably mounted on a shaft 14 secured to said side wall 2 and having its foremost part facing to and engageable with tooth flanks 8 of the respective teeth of the lock-up gear 7. The numeral 13 indicates a pin projectingly provided to the foremost lateral face of the lock-up lever 12 and engageable with the teeth 10 of the auxiliary lock-up gear 9.

Numeral 15 indicates a housing of an automatic lock-up mechanism secured to the lower surface of the belt housing 1. Said housing 15 has a saucer-like section 16 on its one side, a depressed section 18 on its other side and a central elevated flat section 19. Said saucer-like section 16 has a central depressed zone 17 surrounded by gradually uprising zones, while the central flat section 19 is fitted with an upright shaft 20. Numeral 21 indicates a spherical body carried by said saucer-like section 16 and normally by its central depressed zone 17. The numeral 22 indicates a lock-up control plate formed at one side into an annular section 23 and at the other side into a conical section 24 connecting to said annular section 23 through an intermediate connected part 25. Said annular section 23 is loosely fitted around and encircles said spherical body 21, while the conical section 24 has its pointed end resting on said depressed section 18 of the lock-up mechanism housing 15. Said intermediate connecting part 19 has an oblong hole loosely passed by said upright shaft 20. Said lock-up control plate 22 is regulated in its horizontal movement by a suitable packing 27. Numeral 28 indicates a motion-transmitting pin so positioned that its lower end abuts on an apex part of said conical section 24 when the spherical body 21 is centrally carried by said saucer-like section 16. Said motion-transmitting pin 28 passes in this operative position through said packing 27 and is movable axially in abutting contact with the lower end part of the lock-up lever 12.

Figure 3:
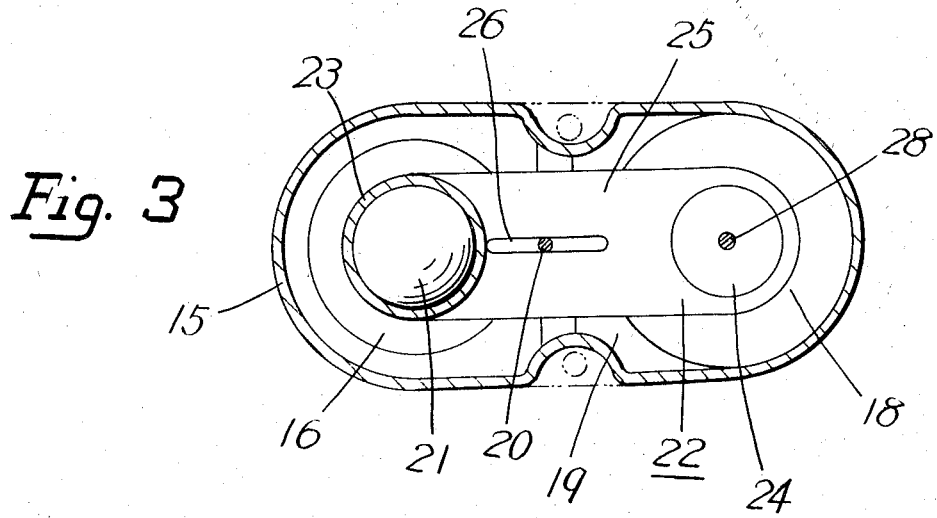
FIG. 3 is a plan sectional view taken on the line III—III of FIG. 1.
Figure 4:
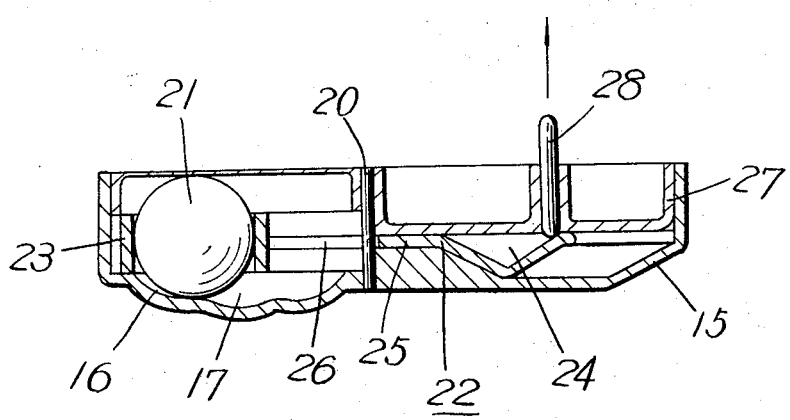
FIGS. 4 and 5 are partly cut front and side elevational views, respectively, of the present lock-up device in its locked up condition.
Figure 5:
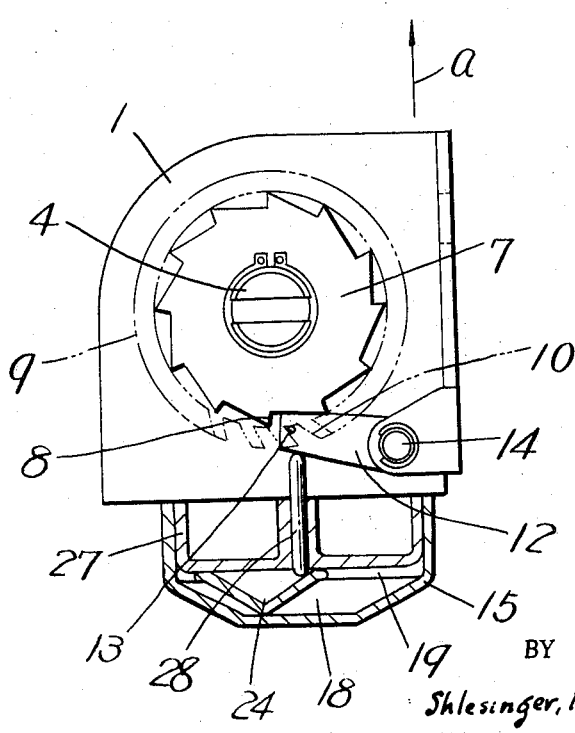

The present device operates as follows:

When the spherical body 21 senses the acceleration and is moved on said saucer-like section 16 through inertia force as for instance in the direction shown in FIG. 4, the lock-up control plate 22 including said conical section 24 will be moved in unison therewith. As a result, the motion-transmitting pin 28 so far kept in abutment at its lower end with the apex part of the conical section 24 will be axially elevated, as illustrated in FIGS. 4 and 5. Thus, the upper part of the motion-transmitting pin 28 will urge the lock-up lever into partial rotation, so that the pin 13 will come into mesh with a tooth 10 of the auxiliary lock-up gear 9 then facing said pin 13, at the same time that the front face of the lock-up lever 12 will abut a correspondingly contoured tooth flank 8 of the lock-up gear 7. As a consequence, the safety belt 5 is locked against rotation in the pay-out direction as denoted by the arrow a in FIG. 2. It will be readily understood that when the auxiliary lock-up gear 9 is restrained from its rotation through the medium of said projecting pin 13, said gear 9 will slide relative to said lock-up gear 7 so as to enable the foremost part of the lock-up lever 12 to frictionally engage with tooth flank 8 of the lock-up gear 7. When the vehicle acceleration is reduced to zero, the spherical body 21, lock-up control plate 22 and motion-transmitting pin 28 and so forth will be returned to their starting positions as shown in FIGS. 1 to 3, but the lock-up lever 12 will remain in its oscillated position by engagement of said pin 13 with said auxiliary lock-up gear 9. When the sleeve 4 is rotated so as to wind up the belt, said lock-up lever 12 will be released from its lock-up position and the automatic lock-up will cease its operation.

In the construction and operation of the present device, the horizontal movement of the spherical body 21 on the saucer-like section 16 is associated with that of the lock-up control plate 22. Such horizontal movement of the lock-up plate 22 will bring about vertical displacement of the motion-transmitting pin 28 through contact thereof with the conical section 24 of the lock-up control plate 22. According to the present invention, the vertical displacement of the core part caused by such movement of the spherical body 21 will not interfere with the movement of the conical section 24. Thus, the vertical stroke of the motion-transmitting pin 28 will always be constant, resulting in the oscillation of the lock-up lever 12 by a constant angle of oscillation. Moreover, since the annular section 23 of the lock-up control plate 22 is loosely fitted around and encircles said spherical body 21, the latter will not be subjected to any pressure from its upper side when sliding down the inclined plane of the saucer-like section 16. As a consequence, the occasional vehicle deceleration will be acutely sensed and the automatic lock-up operation will always be accurate and positive.

What is claimed is:

1. An automatic lock-up device for a vehicular safety belt comprising
a housing,
a shaft rotatable in said housing,
a belt connected at one end to said shaft,
a coil spring connected to said shaft and urging said shaft in one direction to wind said belt thereon,
a lock-up gear secured to said shaft,
a lock-up lever pivotally mounted in said housing for movement to and from locking engagement with said gear,
means for moving said lever to locking engagement with said gear comprising,
a lock-up control plate mounted in said housing to pivot about an axis perpendicular to said shaft and to be slidable in opposite directions radially of said axis,
a motion-transmitting member engaging said lever means on said plate engaging said member to move said lever to locking position either upon pivotal or radial movement of said plate, and
an inertia-responsive member connected to said plate to effect the pivotal and radial movements of said plate.

2. An automatic lock-up device for a vehicle safety belt comprising
a housing having a saucer-like recess therein,
a shaft rotatable in said housing,
a belt connected at one end to said shaft,
a coil spring connected to said shaft and urging said shaft in one direction to wind said belt thereon,
a lock-up gear secured to said shaft,
a lock-up lever pivotally mounted in said housing for movement to and from locking engagement with said gear,
a lock-up control plate movable in a horizontal plane and having an annular portion adjacent one end and a conical portion adjacent its other end,
an inertia-responsive spherical body mounted on said saucer-like recess and in said annular portion to move radially on said saucer-like recess upon vehicle acceleration or deceleration, and
an axially-movable motion transmitting pin engaging at one end with said conical portion, and abutting at its other end with said lever to transmit motion of said plate to said lever.

3. An automatic lock-up device for a vehicular safety belt as claimed in claim 1, wherein said housing has a saucer-like recess, said inertia-responsive member is a ball movable in said recess, said ball is mounted in an opening in said plate to transmit motion to said plate when said ball moves in said recess, and said plate has a conical recess therein, said motion-transmitting member is a pin engaging said conical recess at one end and is connected at its other end with said lever to transmit the motion of said plate to said lever.

4. An automatic lock-up device as claimed in claim 3, wherein said plate is mounted for its pivotal movement about a shaft which is secured in said housing and which passes through an elongate slot in said plate.

* * * * *